United States Patent [19]

Tamura et al.

[11] Patent Number: 5,506,738
[45] Date of Patent: Apr. 9, 1996

[54] TAPE CASSETTE WITH TAPE GUIDE SUPPORT STRUCTURE

[75] Inventors: Masafumi Tamura; Mitsuru Harada; Masato Tanaka; Kiyotaka Yanaka, all of Tokyo, Japan

[73] Assignee: Sony Corporation, Tokyo, Japan

[21] Appl. No.: 347,845

[22] Filed: Dec. 1, 1994

Related U.S. Application Data

[63] Continuation of Ser. No. 75,559, filed as PCT/JP92/01403, Oct. 30, 1992, abandoned.

[30] Foreign Application Priority Data

Oct. 31, 1991 [JP] Japan ................................ 3-285263
Oct. 31, 1991 [JP] Japan ................................ 3-285266

[51] Int. Cl.$^6$ ............................ G11B 15/60; G11B 23/04
[52] U.S. Cl. ................. 360/132; 360/130.21; 242/346.2; 226/191
[58] Field of Search ............................ 360/132, 85, 95, 360/130.23; 242/198, 199, 346, 346.1, 346.2; 226/191, 196

[56] References Cited

U.S. PATENT DOCUMENTS

| | | | |
|---|---|---|---|
| 3,662,937 | 5/1972 | Borman | 360/132 |
| 3,829,040 | 8/1974 | Nelson | 242/199 |
| 3,884,430 | 5/1975 | Martin | 242/199 |
| 4,440,359 | 4/1984 | Nelson | 242/199 |
| 4,518,134 | 5/1985 | Oishi et al. | 242/346.2 |
| 4,624,399 | 11/1986 | Merle | 226/181 |
| 5,140,487 | 8/1992 | Tanaka et al. | 360/132 |

FOREIGN PATENT DOCUMENTS

| | | | |
|---|---|---|---|
| 477588 | 9/1973 | Australia . | |
| 0431899 | 6/1991 | European Pat. Off. . | |
| 2434454 | 3/1980 | France . | |
| 55-77050 | 6/1980 | Japan . | |
| 58-35751 | 3/1983 | Japan | 360/85 |
| 60-142841 | 9/1985 | Japan . | |

*Primary Examiner*—Robert S. Tupper
*Assistant Examiner*—William J. Klimowicz
*Attorney, Agent, or Firm*—Jay H. Maioli

[57] ABSTRACT

A tape cassette includes a pair of pinch rollers 118, 119 for guiding a magnetic tape T movably provided in a cassette opening 75 of shell body 71. Both ends of a roller shaft 124, 125 rotatably supporting each pinch roller 118, 119 are supported, and there are provided, around middle portions of these roller shafts, receiving portions 120b, 121b swingably holding the pinch rollers 118, 119. Therefore, the receiving portions 120b, 121b provide the self aligning effect of the pinch rollers 118, 119 with respect to the roller shafts 124, 125. Accordingly, it is possible to mitigate the dimensional accuracies and installation accuracies of component parts, and to prevent each roller shaft from being deflected by the pressure of a capstan.

4 Claims, 18 Drawing Sheets

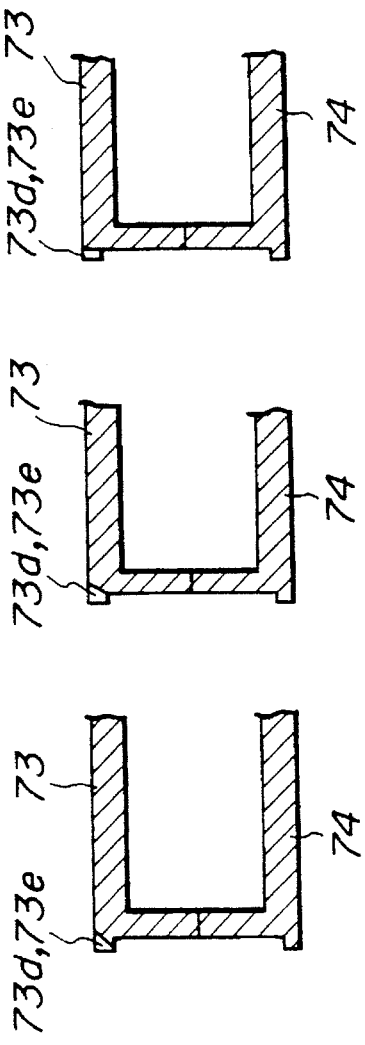

TAPE CASSETTE WITH TAPE GUIDE SUPPORT STRUCTURE

This is a continuation of application Ser. No. 08/075,559 filed as PCT/JP92/01403, Oct. 30, 1992, now abandoned.

TECHNICAL FIELD

The present invention relates to tape cassettes which are suitable for use in recording and/or reproducing equipment employing a non-tracking mode.

DESCRIPTION OF THE BACKGROUND

In general, for high density recording such as digital recording or video recording, a recording and/or reproducing system (hereinafter referred to as a record-reproduce system) having a rotating head of a helical scan type is used.

For loading in a record-reproduce system of such a type, there has been proposed a tape cassette of a very small size (about 20 mm long and 30 mm wide in planar dimensions). Such a tape cassette includes a shell body having an opening for insertion and extraction of a head drum, and a ribbonlike recording medium which is windingly packed in the shell body and which is wound on the outside circumferential surface of the head drum.

Explanation is made about this tape cassete with reference to FIGS. 18–20. In these figures, what is indicated at a reference numeral 1 is a tape cassette shell body. This shell body 1 consists of upper and lower halves 3 and 4 fixed together by screws 2a–2d. The shell body 1 has a cassette opening 5 in a front side for insertion and extraction of a later-mentioned head drum.

Each half 3, 4 of the shell body 1 has vertically extending through holes 3a, 3b, 4a, 4b. Between both through holes 3a, 3b or 4a, 4b, a transparent plate 6, 7 for checking a residual amount of the tape is attached to cover a rectangular, as viewed in a plan view, opening 3c, 4c of each half.

In each half 3, 4 of the shell body 1, there are further formed mis-erase preventive setups 8, 9 located in both lateral portions near a rear side of the half and extending into the half, reference holes 10, 11, 12, located in the middle and left and right lateral portions near the rear of the half, for positioning the cassette, a plurality of check holes 13, 14 which are arranged at intervals along the left and right direction in the rear portion of the half, and grip portions 15, 16 located in both lateral rear portions.

In each lateral front end portion of each of the halves 3, 4, there is formed a stepped shaft supporting surface 20 having a laterally projecting pin 18, and stopper surface 22 continuous with the shaft supporting surface 20. (These features are formed on both the left and right lateral front end portions, although only the right portion is shown in FIG. 18.) In a stepped portion 20a of the shaft supporting surface 20, there is integrally formed a vertically extending click projection 23.

In the bottom of the lower half 4 among both halves 3, 4, there is formed a recessed portion 25 opening toward the upper half, for receiving a brake. In this recessed portion 25, there are provided brake spring abutting projection 26, and brake guide pins 27, 28 arranged at intervals in the front and rear direction.

Reference numerals 29 and 30 denote tape winding hubs spaced at a predetermined distance from each other. Each hub consists of an inner hub 31, 32 having a through hole 31a, 32a for receiving a hub driving shaft, and a projected portion (not shown) for controlling the rotation, and an outer hub 33, 34 surrounding the inner hub and having a recessed portion (not shown) engaged with the above mentioned projected portion. The hubs are located in the positions corresponding to the holes 3a, 4a, 3b, 4b of each half 3, 4, and rotatably supported within the shell body 1. The inner hub 31, 32 of each hub 29, 30 is provided with a plurality of hub engaging portions 31b, 32b projecting in the outside circumferential surface and being exposed in the shell body. A magnetic tape T serving as a ribbonlike recording medium for recording and/or reproducing PCM signals, for example is wound on the outside circumferential surfaces of the outer hubs 33, 34.

A reference numeral 35 denotes a brake for braking the hubs 29, 30 when the cassette is out of use. The brake 35 includes an approximately T-shaped, in a plan view, brake piece 36 having arms 36a, 36b projecting toward both lateral front ends, and spring engaging portions 36c, 36d projecting forwardly of the arms 36a, 36b; and a brake spring 37 such as a stainless wire which is held by the engaging portions 36c, 36d of the brake piece 36 so as to abut on the projection 26, and which extends in the left and right direction. The brake 35 is provided in the recessed portion 25. The brake 35 has detents 38, 39 projecting rearwardly of the arms 36a, 36b and engaging with the engaging portions 31b, 32b during braking; guide portions 40, 41 for guiding the pins 27, 28; and a push operating portion 42 having cam surfaces 42a (only one of which is shown) on which a positioning pin (not shown) abuts when the cassette is loaded.

Reference numerals 43 and 44 denote pinch rollers for guiding the magnetic tape T. The pinch rollers are rotatably provided through roller shafts 45, 46 on both sides of the opening 5.

Reference numerals 47 and 48 denote vertically extending support pieces which are integrally provided with respect to the upper half 3 so that projecting end portions abut on the lower half 4.

Reference numerals 49 and 50 denote guide projections for preventing the tape from being forced out of the shell body 1. Each guide projection 49, 50 consists of upper and lower projections having projecting end surfaces confronting each other. These projections are located on the outer sides of the support pieces 47, 48, and each is integrally provided in the corresponding one of the upper and lower halves 3, 4.

Reference numerals 51 and 52 denote self aligning guides having grooves 51a, 52a for guiding the magnetic tape T. These guides 51 and 52 are movably provided through pivot shafts 53, 54 in the lower half 4.

A reference numeral 55 denotes a U-shaped lid for shutting the cassette opening 5. The lid has a cover portion 57 for opening and closing the cassette opening 5, and two arms 58, 59 projecting from both sides of the cover portion 57, and confronting the shaft supporting surfaces 20 contiguously. The lid is rotatably provided on the upper half 3 of the shell body 1. The cover portion 57 of the lid 55 is formed with a guide groove 57a extending in the left and right direction, and a rack gear 57b for engaging with a cassette changer (not shown). The arms 58, 59 are formed with shaft holes 58a, 59a for the pins 18, and click grooves 59b corresponding to the click projections 23.

A reference numeral 60 denotes a head drum having an outside peripheral surface on which the magnetic tape T is helically wound, and a reference numeral 61 denotes a head which rotates while being inclined at a predetermined angle with respect to the head drum 60. Reference numerals 62 and 63 denote wing guides which are provided on both sides of the head drum 60 and which are inserted into and extracted from the cassette opening 5. Reference numerals 64 and 65 denote flanges which are provided at the projecting ends of the wing guides 62 and 63 and which locate the magnetic tape T with respect to the head drum 60 in the widthwise direction.

In the thus-constructed tape cassette, the magnetic tape T is helically wound on the outside peripheral surface of the head drum 60 by insertion of the head drum 60 in the cassette opening 5 of the shell body 1, and then the head 61 runs obliquely with respect to the magnetic tape T, so that the helical scan type recording and/or reproducing operations are performed.

In this kind of tape cassette, on the occurrence of a positional shift of the tape cassette during insertion of the cassette in the record-playback equipment, or an error in the inclination of the head drum, the head drum 60 inserted in the opening 5 does not abut the self aligning guides 51, 52 in the correct state, and the sliding movement of the magnetic tape T on the outside surface of the head drum 60 becomes unstable, which incurs troubles in recording and/or reproducing.

Therefore, in the conventional tape cassette, the self aligning guides 51 and 52 are made rotatable around the pivot shafts 53, 54, and the tape guides are made inclinable with respect to the shafts 53, 54, and movable back and forth in the lateral direction perpendicular to the inserting and extracting direction of the head drum 60. With the thus-arranged tape guides movable relative to the shell body 1, the magnetic tape T is put in sliding contact with the outside surfaces of the self aligning guides 51, 52 in a stable state to perform the recording and/or reproducing. This is what the conventional cassette takes as countermeasures.

In the conventional tape cassette, however, the pinch rollers 43, 44 are not swingable, and the receiving portions of the pinch rollers 43, 44 are located at positions shifted downwardly from the middle in the axial direction. Furthermore, the roller shafts 45, 46 are arranged as a cantilever structure. Therefore, when the tension of the magnetic tape during recording and/or reproducing causes an excessive force acting in the radial direction of the roller, then this cassette cannot gain a sufficient self aligning effect for correcting the inclinations of the roller shafts 45, 46. As a result, there arises need for stringently controlling the dimensional accuracy and assembling accuracy of the component parts of the cassette in order to obtain the ideal tape path, so that the cassette manufacturing and assembly process is complicated Besides, the cantilever supporting structure of the roller shafts 45, 46 makes it easy for the roller shafts 45, 46 to bend due to the pressure of a capstan, and the persistence of this bent state results in creep deformation.

In the conventional tape cassette, moreover, if the cassette is loaded in the record and reproduce equipment in such a state that the self aligning guides 51, 52 are juxtaposed in the up and down direction, the self aligning guide 51 on the upper side becomes unable to fitly approach the downwardly shifted head drum 60 under the circumstances in which the degree of freedom of motion of the self aligning guides 51, 52 in the up and down direction is lower than the degree of freedom of motion of the head drum 60 in the up and down direction. Therefore, the head drum 60 must move up and become fitted to the self aligning guide 51 on the upper side. It is conceivable that this occurs especially when there exist a positional error of the wing guide 62, 63 with respect to the head drum 60 in the drum inserting direction or in the approaching direction of the wing guides, a dimensional error between both self aligning guides 51, 52, and dimensional errors of both elongate guide holes (not shown) of the self aligning guides 51, 52.

Consequently, the resistance in movement of the head drum 60 increases, and there is formed, between the head drum 60 and the self aligning guide 51, a gap of a size corresponding to the weight of the head drum 60, the frictional force loss due to the pressure of the self aligning guide 51 and the elongate guide hole (not shown) or the frinctional force loss of the head drum 60 and a drum supporting portion (not shown) during movement of the drum in the front and rear direction. This gap deteriorates the recording and/or reproducing performance.

OBJECTS AND SUMMARY OF THE INVENTION

It is therefore a first object of the present invention to provide a tape cassette which can simplify the cassette manufacturing and assembly process and which can prevent the creep deformation due to the persistence of deflection of the roller shaft.

It is another object of the present invention to provide tape cassettes which can cause the head drum and the self aligning guides to abut one another reliably, thereby to provide satisfactory recording and/or reproducing performance.

In a tape cassette according to the present invention, the tape cassette is provided with a shell body (case) having an opening through which a head drum is inserted and extracted, and a ribbonlike recording medium windingly disposed in the shell body and wound around the outside circumferential surface of the head drum, a pair of pinch rollers for guiding the recording medium are movably disposed in the opening of the shell body, and the ends of a roller shaft rotatably supporting each pinch roller are both supported or both fixed, and there is provided, around a middle portion of each of these roller shafts, a receiving portion swingably holding the pinch roller.

Furthermore, in a tape cassette according to the present invention there are provided a shell body having an opening through which a head drum is inserted and extracted, and a ribbonlike recording medium windingly disposed in the shell body and wound around the outside circumferential surface of the head drum. A pair of tape guides guiding the recording medium are movably provided in the opening of the shell body, and on the drum extraction side of each tape guide, a drum guide is provided for guiding the head drum to a drum inserted position.

According to the present invention, the receiving portions can provide a self aligning effect of the pinch rollers with respect to the roller shafts.

Moreover, according to the present invention, during cassette loading, the drum guides can regulate the movement of the head drum and cause both self aligning guides to move mainly.

BRIEF DESCRIPTION OF THE DRAWINGS

FIGS. 16 (A)–(C) are sectional views each showing the edge of the upper half of the tape cassette of the present invention.

FIGS. 17 (A) and (B) are plan views showing patterns for discriminating the recording and playing time of the recording medium of the tape cassette of the present invention.

DETAILED DESCRIPTION OF THE PREFERRED EMBODIMENTS

The following is a detailed explanation on the construction of the invention and the like, using a practical example of the invention shown in the figures.

Figure 18:
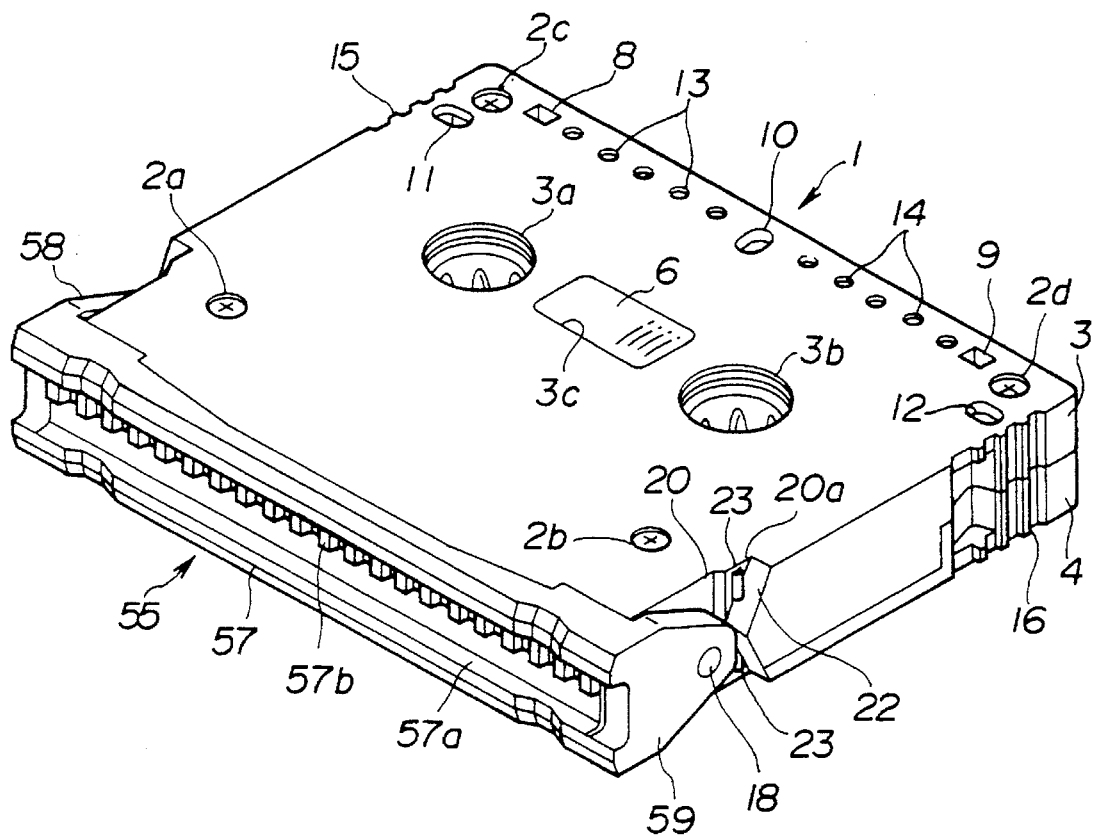
FIG. 18 is a perspective view showing the whole conventional tape cassette.
Figure 19:
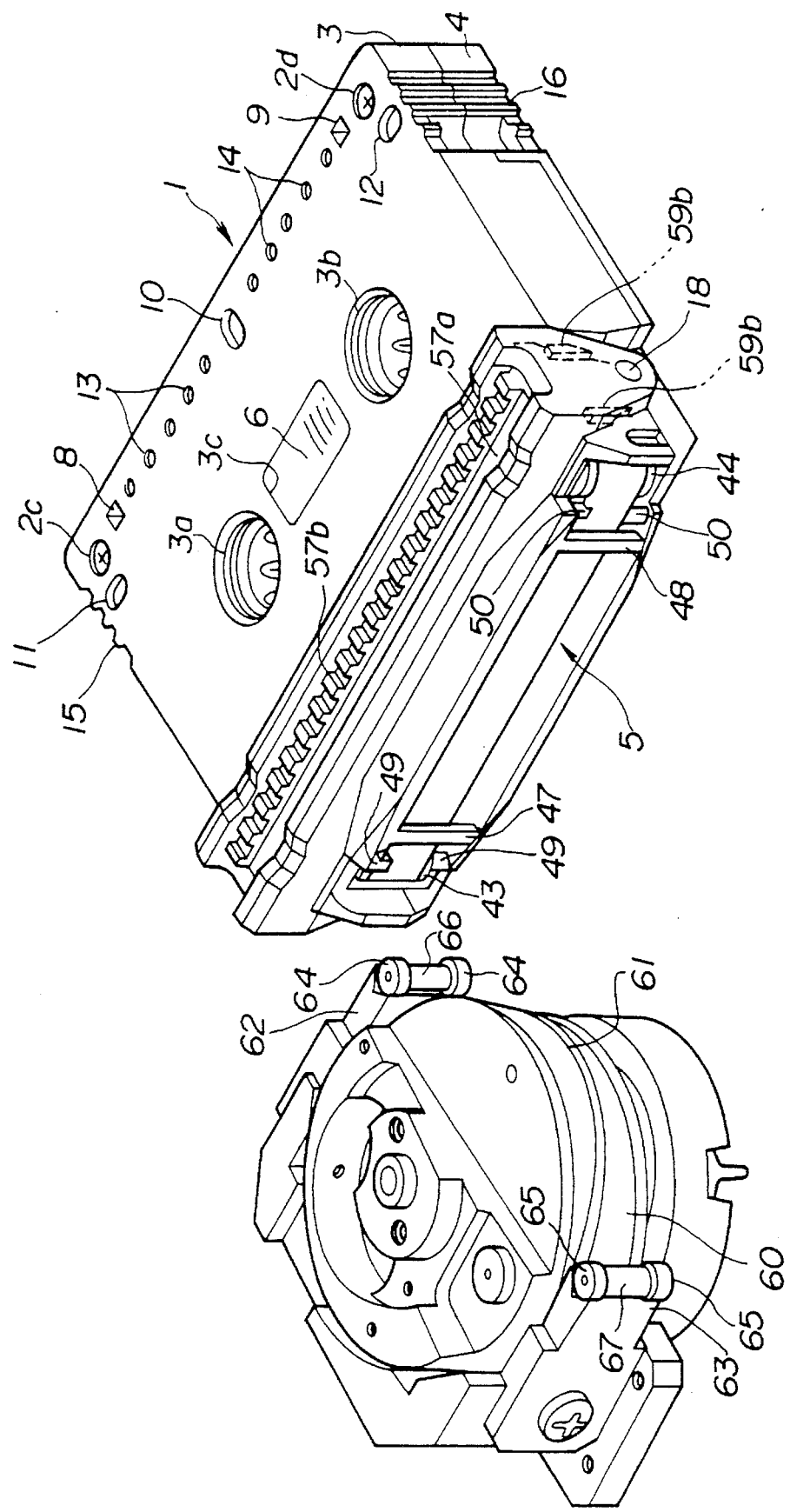
FIG. 19 is a perspective view showing a relation between the conventional tape cassette and the head drum before drum insertion.
Figure 20:
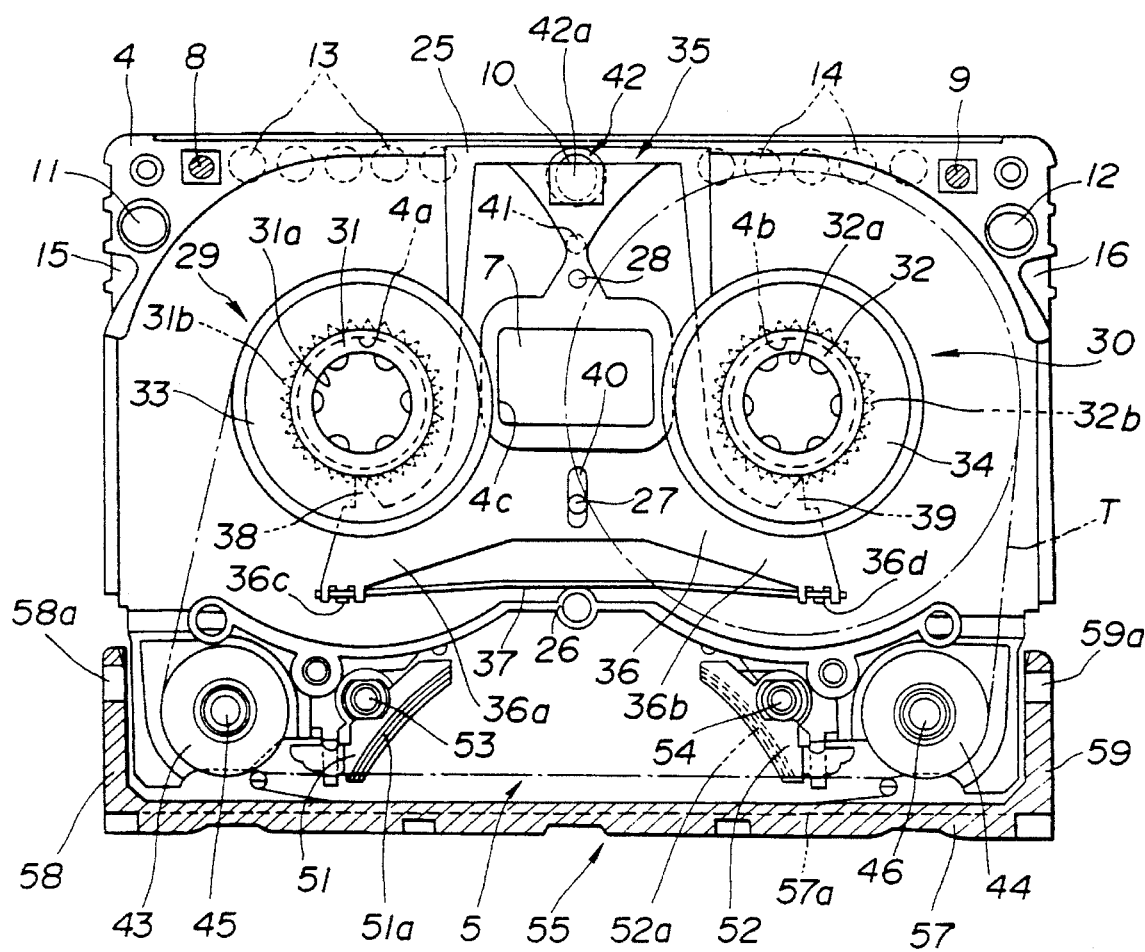
FIG. 20 is a plan view showing the lower half of the conventional tape cassette.

In these figures, the same reference numerals are used for the head drum 60, head 61, wing guides 62, 63, flanges 64, 65 and tape guide portions 66, 67 shown in FIGS. 18–20.

In the figures, reference numeral 71 denotes a shell body (or case) 71 for a tape cassette. This shell body 71 consists of upper and lower halves (upper and lower shells) 73 and 74 which are fastened together by screw fasteners 72a–72d. In the front end face's side of the shell unit 71, there is formed a cassette opening 75 through which a later-mentioned head drum 60 is inserted and extracted.

The shell unit 71 is approximately shaped like a rectangular parallelepiped, and has relatively wide, approximately rectangular, upper and lower faces, long and narrow, approximately rectangular front and rear (back) faces, and narrow and relatively short left and right side faces. The opening 75 is formed in the front face. The direction perpendicular to the front and rear faces is a front and rear direction. The direction pointing from the rear face to the front face is a forward direction, and the opposite direction is a rearward direction. The direction which is perpendicular to the left and right faces and which intersects the front and rear direction at right angles in a horizontal plane is a left and right (lateral) direction.

In each of the halves 73 and 74 of this shell body 71, there are formed through holes 73a and 73b or 74a and 74b. Between both through holes 73a and 73b, and between both through holes 74a and 74b, transparent plates 76 and 77 for checking the residual amount of a tape are attached to close half openings 73c and 74c which are rectangular as viewed in a plan view.

In each half 73 or 74 of the shell unit 71, there are further provided mis-erase preventive setups 78 and 79 which are located in both lateral portions near the half's back side; cassette positioning reference holes 80, 81, 82 which are located in the half's rear middle and the half's rear, left and right, lateral portions; a plurality of detection holes 83 and 84 which are arranged at intervals along the left and right direction in the half's rear portion; and grip portions 85 and 86 which are located in the rear portions of both lateral sides of the half.

Of the halves 73 and 74, the upper half 73 has the rear end edge which is formed with a plurality of recesses 73d and 73e designed to discriminate the recording and/or reproducing obverse side of a later-mentioned magnetic tape from the reverse side, and the recording and/or reproducing time of the magnetic tape. The recesses 73d and 73e are arranged at intervals along the left and right direction.

These recesses 73d and 73e are depressed to have larger and smaller widths, and have side wall surfaces which are triangular, trapezoidal or rectangular as shown in FIGS. 16(A) –16(C). The widths of the open portions of both of the recesses 73d and the recesses 73e are so chosen as to correspond, respectively, to long and short recording and/or reproducing times, for example, 30 minutes and 10 minutes. With these recesses 73d and 73e, it is possible to recognize that the recording and/or reproducing time is 140 minutes (30 min×4 and 10 min×2). In this case, one can discern the existence and nonexistence, the numbers, and the difference of the widths of the recesses 73d and 73e by touching and stroking the edge between the upper surface and the rear surface of the upper shell 73 with one's finger.

There are various other conceivable discrimination patterns for the recording and/or reproducing time. In an example shown in FIG. 17(A), a combination of recesses having larger and smaller widths can indicate 40 min which is a sum of 30 min and 10 min. In another example shown in FIG. 17(B), it is possible to indicate a total of 100 min resulting from addition of 60, 30 and 10, with a combination of recesses having long, medium and short widths.

In the bottom of the lower half 74 among both halves, there is formed a recess 95 for receiving a brake. The recess 95 opens toward the upper half 73. In the recess 95, there are formed a projection 96 for abutting on a brake spring 113, and brake guide pins 97 and 98, which are arranged at intervals along the front and rear direction.

In the front end portions of both lateral sides of both halves 73 and 74, there are formed stepped shaft supporting surfaces 99 and 100 having pivotal pins 99a and 100a projecting laterally; and stopper surfaces 101 and 102 continuous with the shaft supporting surfaces 99 and 100. In stepped portions 99b and 100b of the shaft supporting surfaces 99 and 100, there are formed integrally click projections 103 and 104 extending in the up and down direction.

Reference numerals 105 and 106 denote hubs used to wind the tape. The hubs 105 and 106 are juxtaposed at a predetermined distance from each other. Each hub 105 or 106 comprises an inner hub 107, 108 having a through hole 107a, 108a for engaging with a hub drive shaft, and projected portions 107b, 108b for regulating rotation; and an outer hub 109, 110 encircling the inner hub 107, 108 and having depressed portions 109a or 110a engaging with the projected portions 107b or 108b. The hubs 105 and 106 are located, respectively, at the positions corresponding to the through holes 73a, 74a and 73b, 74b, and disposed rotatably in the shell body 71. Each of the inner hubs 107, 108 has many hub engaging portions 107c, 108c which project from the outside surface of the inner hub, and exposed in the shell body 71. The ribbonlike recording medium in the form of a magnetic tape T for recording and/or reproducing PCM signals, for example, is wound around the outside surfaces of the outer hubs 109, 110.

A reference numeral 111 denotes a brake for braking the hubs 105, 106 when the cassette is not being used. The brake 111 includes a brake plate 112 and a brake spring 113. The brake plate 112 has arms 112a, 112b projecting towards both lateral sides of the front end portion, and spring retaining portions 112c, 112d projecting forwardly from the arms 112a, 112b. The brake plate 112 is approximately T-shaped as viewed in a plan view. The brake spring 113 extends in the left and right direction, is held by the spring retaining portions 112c, 112d of the brake plate 112, and abuts the above-mentioned projection 96. For example, the brake spring 113 is in the form of a stainless wire. The brake 111 is disposed in the above-mentioned recess 95. In the brake 111, there are further provided detents 114a, 114b which project rearwardly from both arms 112a, 112b, and which are engaged with the hub engaging portions 107c, 108c when the brake is applied to the hubs; through holes 115, 116 regulating both of the above-mentioned brake guide pins 97, 98; and a pushing operation portion 117 having upper and lower cam surfaces 117a (only the upper cam surface is shown) on which a positioning pin (not shown) abuts when the cassette is loaded.

Reference numerals 118 and 119 denote pinch rollers of up and down symmetry, for guiding the magnetic tape T. Each pinch roller 118, 119 includes a tubular holder 120, 121, and a roller guide 122, 123 of rubber, for example, mounted on the outside circumferential surface of the holder. Each holder 120, 121 has flanges 120a, 121a which project from the outside circumferential surface at the upper and lower open end portions and which have end surfaces confronting the bottom surfaces of the upper and lower halves 73, 74 with a predetermined gap g; and an annular receiving portion 120b, 121b projecting from the inside circumferential surface of the holder in the middle along the axial direction. The magnetic tape T is put in sliding contact with the roller guides 122, 123. The pinch rollers 118 and 119 are rotatably disposed, respectively, through roller shafts 124, 125, in the left and right sides within the above-mentioned cassette opening 75.

If each pinch roller 118, 119 of up and down symmetry is bisected into upper and lower halves by an imaginary plane intersecting, at right angles, the axis of that pinch roller, then one of these upper and lower halves is substantially a mirror image of the other.

The roller shaft 124, 125 of each of these pinch rollers 118, 119 has a large diameter cylindrical section 124a, 125a which is integrally provided in the bottom surface of the above-mentioned lower half 74 and which has a receiving surface in a thrust direction of the above-mentioned receiving portion 120b, 121b; a small diameter cylindrical section 124b, 125b which is fit by press fit in a shaft receiving body (shaft receiving portion) 126 that is integral with the upper half 73, and which has an outside diameter smaller than the outside diameter of the large diameter section 124a, 125a; and a medium diameter cylindrical section 124c, 125c which is formed continuously with the small diameter section 124b, 125b and the large diameter section 124a, 125a, and which has an outside circumferential surface confronting and touching the inside circumferential surface of the receiving portion 120b, 121b. Thus, the roller shafts 124, 125 are in the form of a three section round bar composed of these large, medium and small diameter sections.

Figure 1:
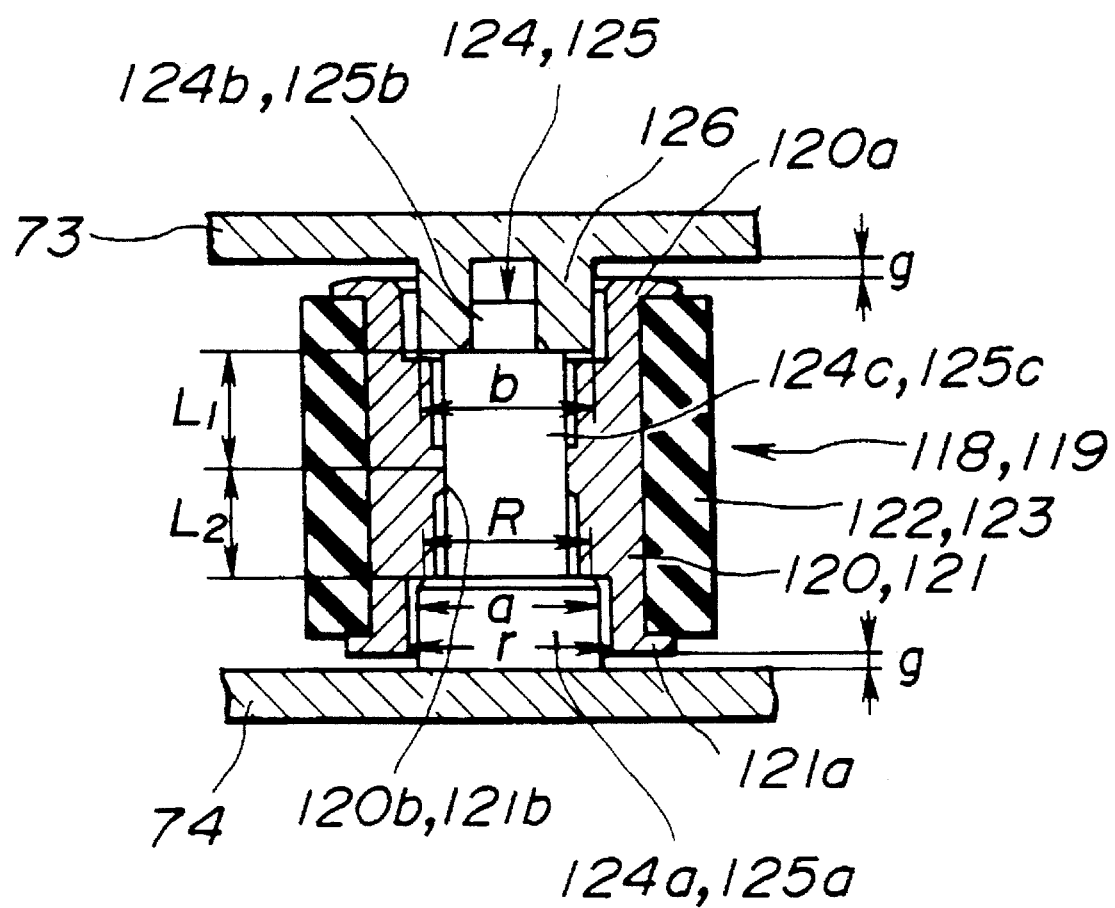
FIG. 1 is a sectional view showing a pinch roller in an installed state, of a tape cassette according to the present invention.
Figure 2:
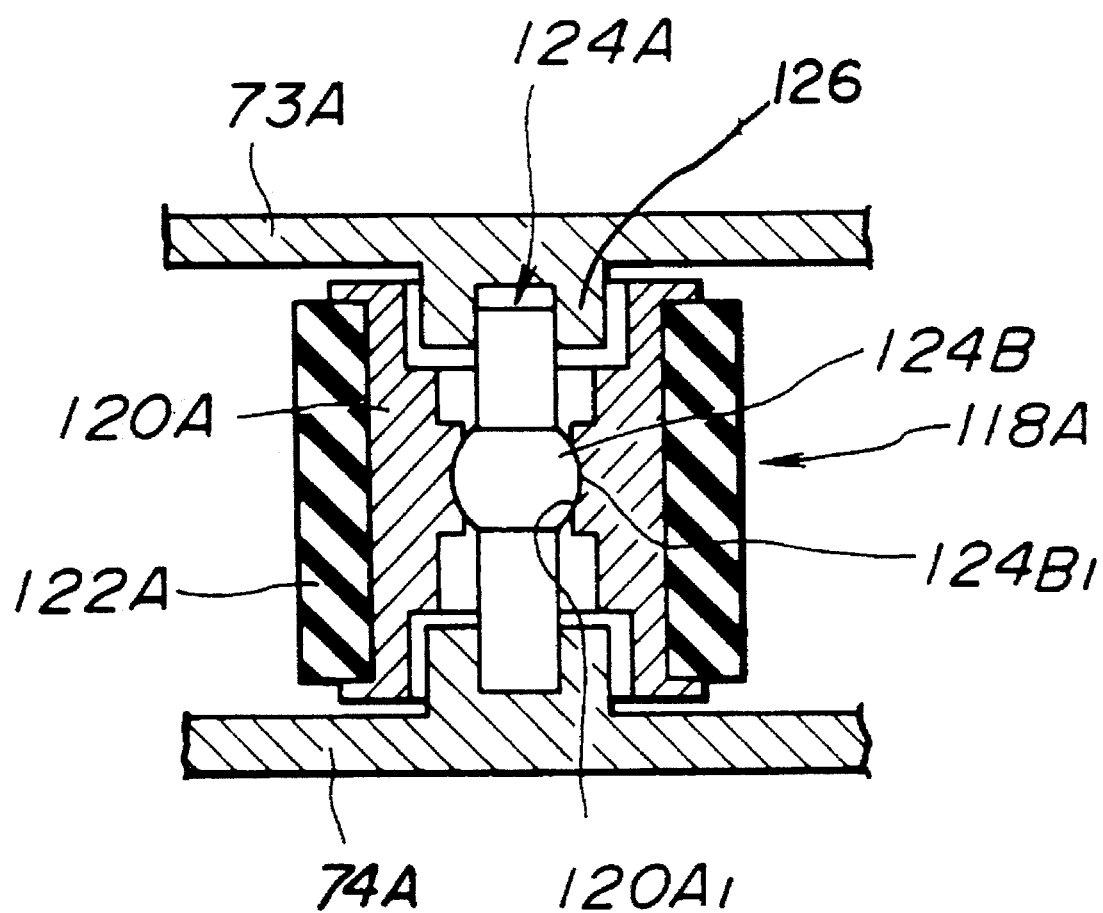
FIG. 2 is a sectional view showing the installed state of another pinch roller of a tape cassette according to the present invention.
Figure 3:
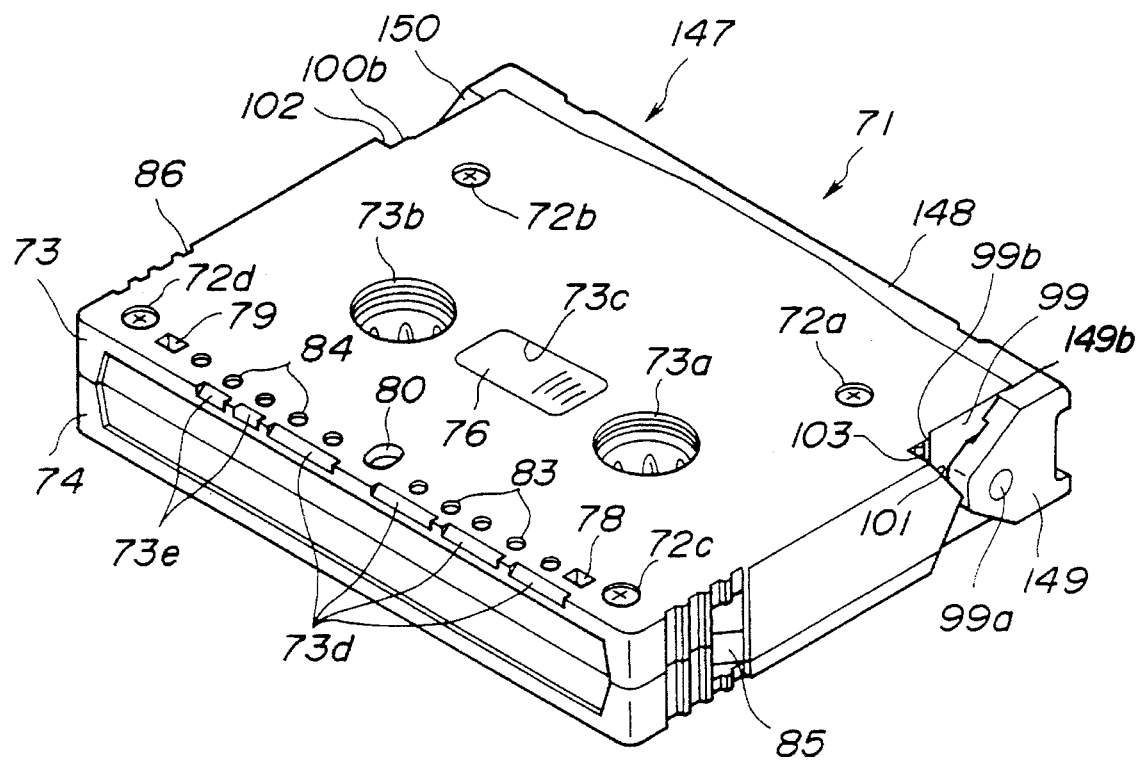
FIG. 3 is a rear side perspective view showing the whole tape cassette according to the present invention.

A roller shaft 124A shown in FIG. 2 is another conceivable example of the roller shafts 124, 125. Both end portions of this roller shaft 124A are fixed to an upper half 73A and a lower half 74A, respectively. A projection 124B having an approximately hemispherical curved surface $124B_1$ is provided at the middle in the axial direction of the roller shaft 124A. A pinch roller 118A of this example includes a holder 120A having a receiving portion 120A1 fit for the projection 124B, and a roller guide 122A which is mounted on the holder 120A and which is brought in contact with the magnetic tape T.

Explanation is herein made of the shaft supporting bodies 126. The shaft supporting bodies 126 have functions of preventing creep falling, and receiving a shaft in the thrust direction, and are integrally formed in the upper half 73. A dimension L1 between the axial middle of the receiving portion 120b, 121b and the thrust receiving surface of the shaft supporting body 126 is equal to a dimension L2 between the axial middle of the receiving portion 120b, 121b and the thrust direction receiving surface of the large diameter section 124a, 125a (L1=L2=L). The outside diameter a of the large diameter sections 124a, 125a of the roller shafts 124, 125 is greater than the outside diameter b of the shaft supporting body 126 (b<a), and a maximum aligning angle of the pinch rollers 118, 119 is determined by the inside diameter r of the holders 120, 121.

The self alignment of the pinch rollers 118, 119 is made more effective as the dimension L becomes smaller and as the diameter R of the thrust receiving surface of the large diameter section 124a, 125a becomes smaller.

The receiving portion 120b, 121b of each holder 120, 121 projects radially inwardly. The inside circumferential surface of the receiving portion is in the form of a curved surface generated by rotating a straight or curved line segment around the axis of the holder 120, 121, and in contact with the outside circumferential surface of the roller shaft 124, 125. Each holder 120, 121 further has upper and lower inwardly facing cylindrical surfaces of a medium diameter, and the receiving portion 120b, 121b is sandwiched between these upper and lower medium diameter, inwardly facing, cylindrical surfaces. These upper and lower medium diameter inwardly facing cylindrical surfaces are out of contact with, and spaced from, the roller shaft 124, 125. Each holder 120, 121 is further formed with inwardly facing cylindrical surfaces of a large diameter above and below the medium diameter inwardly facing cylindrical surfaces. The cylindrical shaft receiving body 126 and the cylindrical large diameter section 124a, 125a are, respectively, spaced from, and surrounded by the upper and lower large diameter inwardly facing cylindrical surfaces of the holder. In each of the upper and lower portions of the holder, the inside diameter (r) of the large diameter inwardly facing cylindrical surface is greater than the inside diameter of the medium diameter inwardly facing cylindrical surface, and there is formed an annular step between both surfaces. The annular step of the upper portion has a substantially flat, upwardly facing annular shoulder surface, and confronts, and can abut on, the downwardly facing thrust receiving surface of the shaft receiving body 126. Similarly, the lower annular step has a downwardly facing annular shoulder surface, and is able to abut the upwardly facing thrust receiving surface of the large diameter section 124a, 125a, so that the axial movement of the holder is limited by this abutment. The lower end of the roller shaft 124, 125 may be integral with the lower half 74, or may be fixed to the lower half. In the illustrated example, the upper end of the roller shaft 124, 125 is forcibly fit in a hole of the shaft receiving body 126, and the shaft receiving body 126 of the upper half 73 supports the upper end of the roller shaft so as to prevent the relative displacement in the radial direction, of the upper end. Therefore, both the upper and lower ends of the roller shaft 124, 125 are supported by the shell body 71 so that the relative displacement with respect to the shell body 71 is not allowed. The shaft receiving body 126 may be fixed to the upper half 73.

Numerals 127 and 128 denote self aligning tape guides 127 and 128 having U-shaped grooves 127a, 128a for guiding the magnetic tape T. The self aligning guides are installed on the left and right sides in the cassette opening 75, and are movably supported on the lower half 74 through pivot shafts 129, 130.

These self aligning guides 127, 128 are formed, on the inner side, with slant surfaces which have a curvature slightly smaller than the outside diameter of the head drum 60, and with slopes of mutually opposite directions in the up and down direction.

Since these self aligning guides 127, 128 are constructed substantially in the same manner, explanation is made only about the self aligning guide 127 on one side (In the figures, each part of the self aligning guide 128 is given the same reference numeral as in the self aligning guide 127.). In the upper and lower open end surfaces of the groove 127a of the self aligning guide 127, there are formed support fringes 131a, 131b which are shaped like a long narrow projection, and which extend with the interposition of a spacing slightly wider than the width of the magnetic tape T. Between these upper and lower support fringes 131a, 131b, there are formed an inclined guide surface 132 which is inclined so as to seem to fall toward the pinch roller's side, and a vertical guide surface 133 which is continuous with the front end portion of the inclined guide surface 132.

In the front end portions of the support fringes 131a, 131b, there are provided receiving fringes 134a, 134b slightly projecting beyond the vertical guide surface 133 in the forward direction. In the inside surfaces of these receiving fringes 134a, 134b, there are formed semicylindrical guide projections 135a, 135b confronting each other with the interposition of a predetermined spacing therebetween. With these guide projections 135a, 135b, the tape guide groove width of the groove 127a on the drum insertion initial end's side (the front side) is made smaller than the tape guide groove width on the drum insertion terminal end's side (the rear side).

In the upper and lower portions on the outer side of the vertical guide surface 133 between the support fringes 131a, 131b, there are further provided pushing fringes 136a, 136b in such a manner as to correspond to the receiving fringes 134a, 134b. On the front sides of these pushing fringes 136a, 136b, there are formed depressions 137 having slant surfaces 137a for guiding the above-mentioned flanges 64 (or 65), which abut these slant surfaces in the drum inserted state.

Of both open end portions of each depression 137, the inner side open end portion (the apex 137A of the slant surface) projects in the extracting direction (the forward direction) of the head drum 60, and is located near the head drum 60 in the drum inserted state.

The self aligning guide 127 is further formed with a shaft receiving, projecting bracket 138 which has a half abutting portion 138a rested on the bottom surface of the lower half 74 and which is located on the outer side of the slant guide surface 132.

This shaft receiving bracket 138 is formed with a shaft hole (elongated hole) 139 which extends in the direction which is inclined with respect to the inserting and extracting direction (the front and rear direction) of the head drum 60, and which is such a direction as to make the ends on the drum insertion's side (the rear ends) closer to each other than the ends on the drum extraction's side. In this shaft hole 139, there is formed a shaft supporting, projecting fringe portion 139a located approximately at the middle in the axial direction. This shaft hole 139 need not be enclosed in the circumferential direction, but it is optional to employ a hole a part of which is cut off.

In the self aligning guide 127, 128, there are provided upper and lower pivots 140a, 140b for self-holding swingably. The fulcrums of the pivots 140a, 140b are located between the pivot shaft of the self aligning guide 127 and the outside circumferential surface of the head drum 60 in the drum inserted state.

Reference numerals 141 and 142 denote drum guides for guiding the head drum 60 to the drum inserted position. The drum guides are situated on the drum extraction's side (the front side) of the self aligning guides 127, 128, in cassette opening 75. The drum guides are provided in the bottom surface of the lower half 74. The drum guides are integral with the lower half 74, or fixed to the lower half 74. On the inner lateral sides of these drum guides 141, 142, there are formed slant surfaces 141a, 142a which abut the outside circumferential surface of the head drum 60. On the outer lateral sides, there are formed positioning portions 141b, 142b engaging later-mentioned support pieces.

These drum guides 141, 142 can reduce a frictional force loss during drum insertion and further reduce positional errors of the pivot shafts 129. 130 by setting a friction inclination angle H (FIG. 9) of the head drum 60 at a large angle. Therefore, it is preferable to provide the drum guides 141, 142 in the lower shell 74 near the drum inserting entrance of the cassette opening 75. It is, however, optional to provide such drum guides in both of the upper and lower halves 73 and 74.

Figure 4:
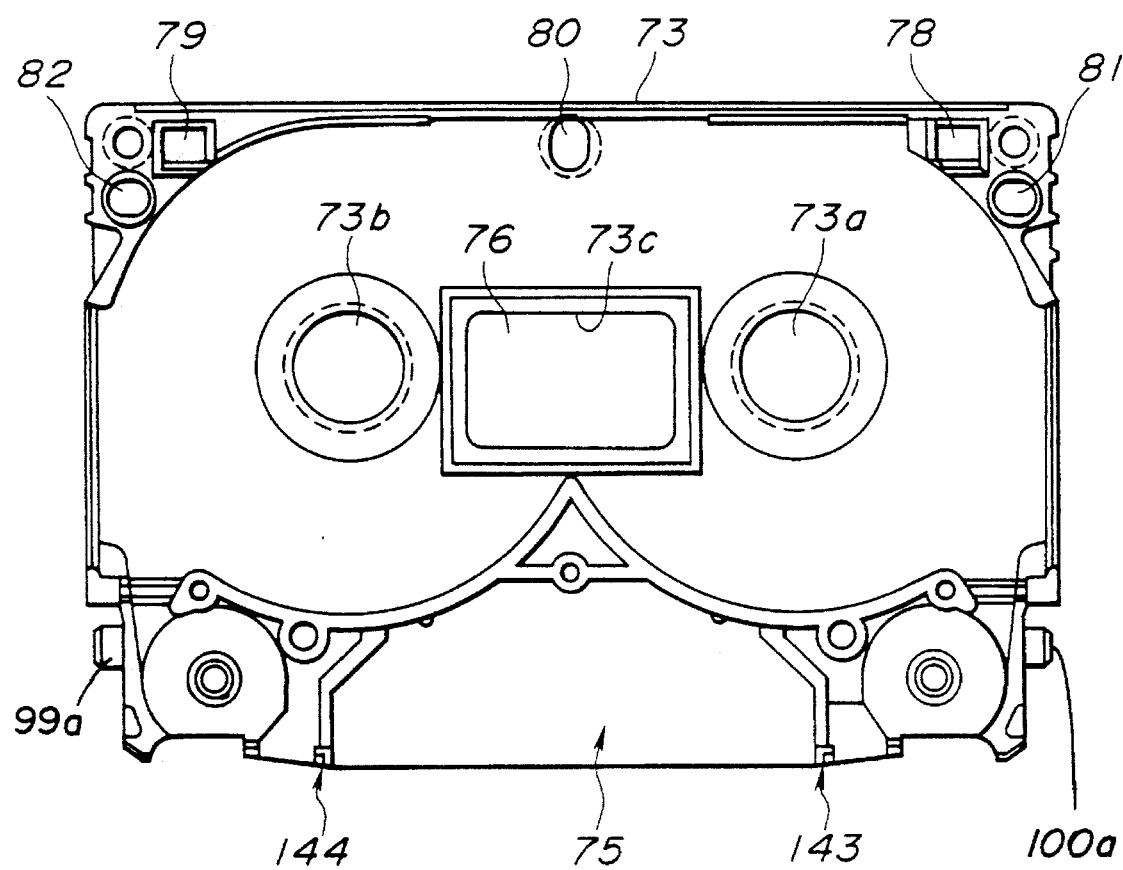
FIG. 4 is a plan view showing an upper half of the tape cassette according to the present invention.
Figure 5:
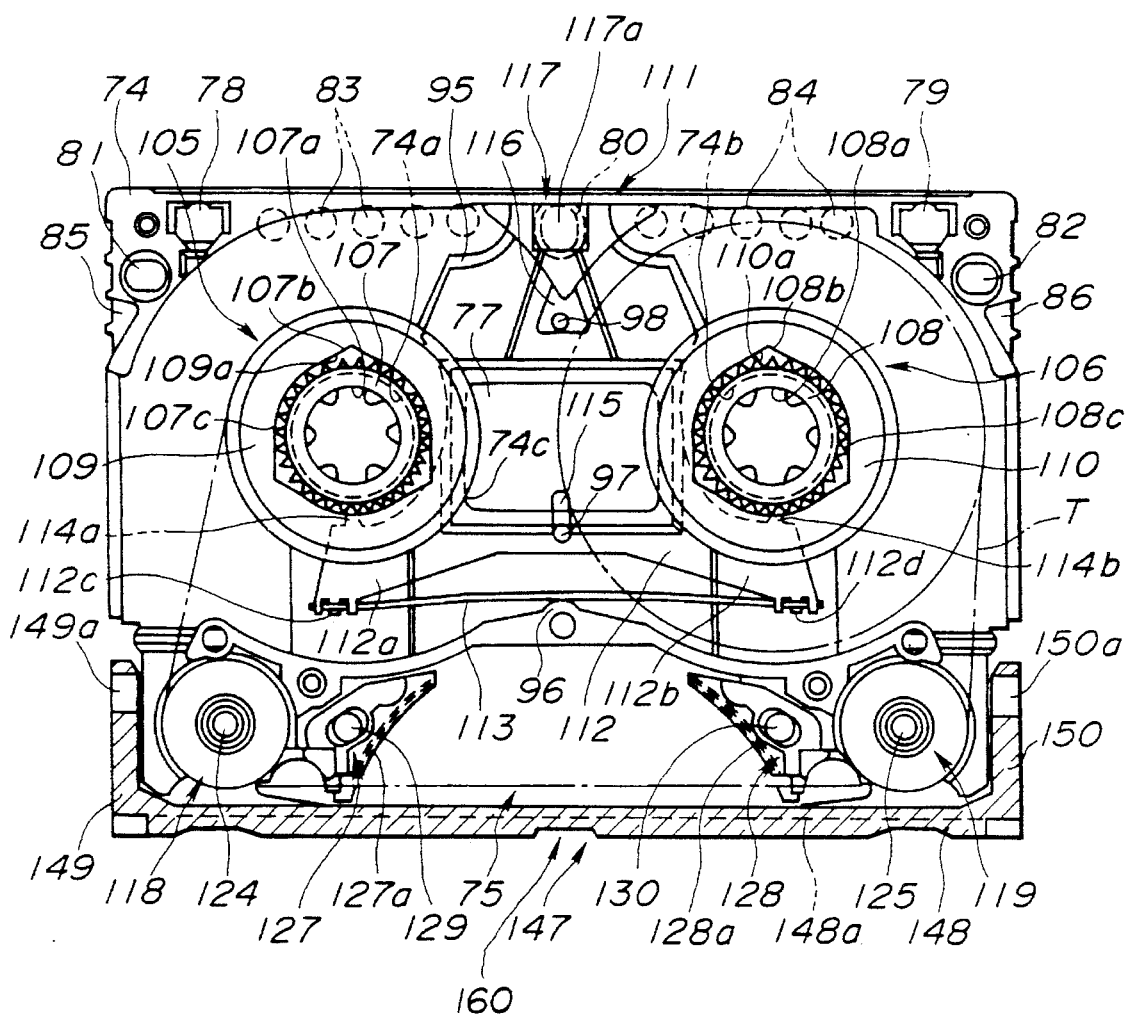
FIG. 5 is a plan view showing a lower half of the tape cassette according to the present invention.
Figure 6:
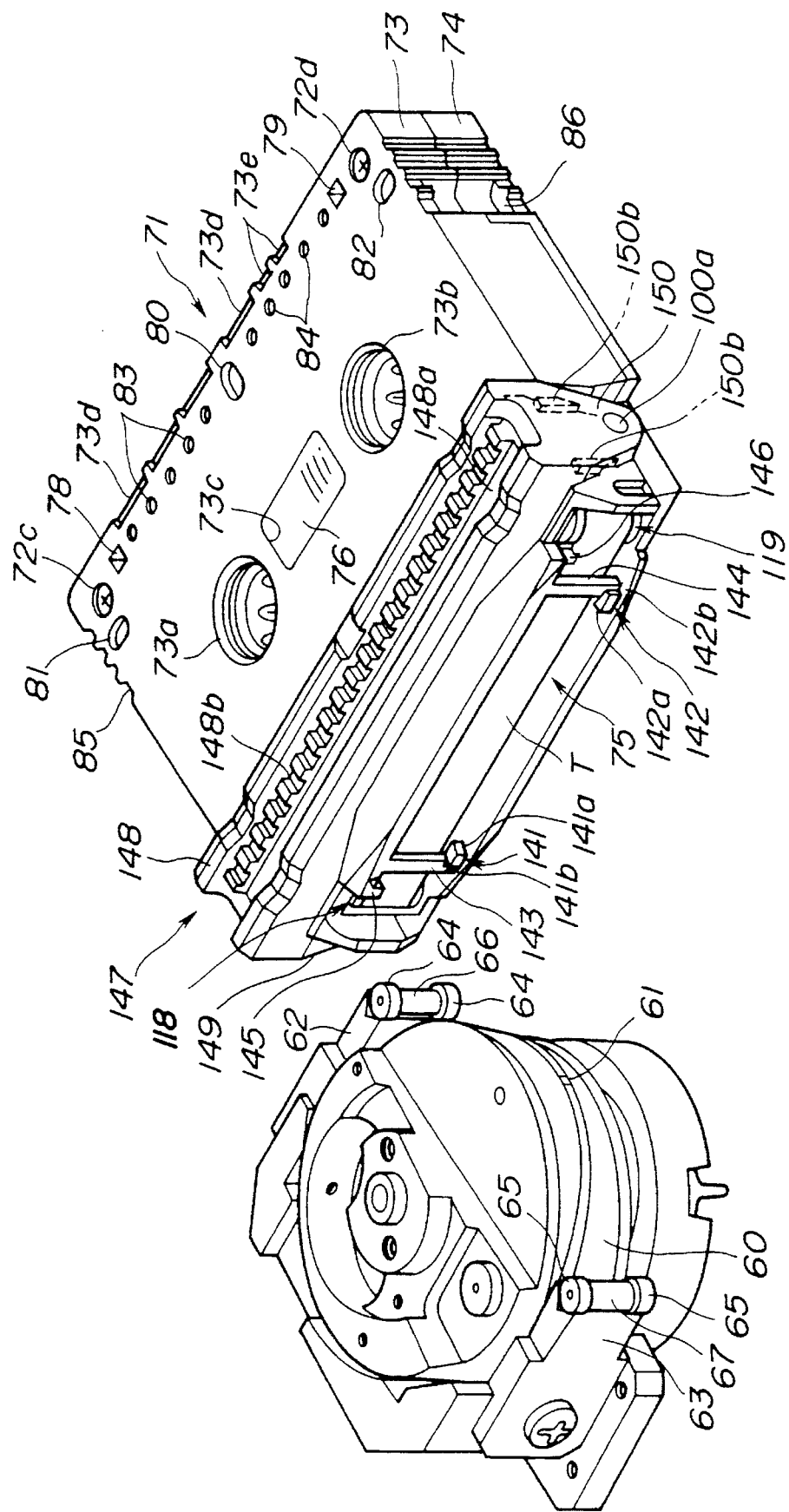
FIG. 6 is a perspective view showing a relation between the tape cassette of the present invention and a head drum before the drum insertion.
Figure 7:
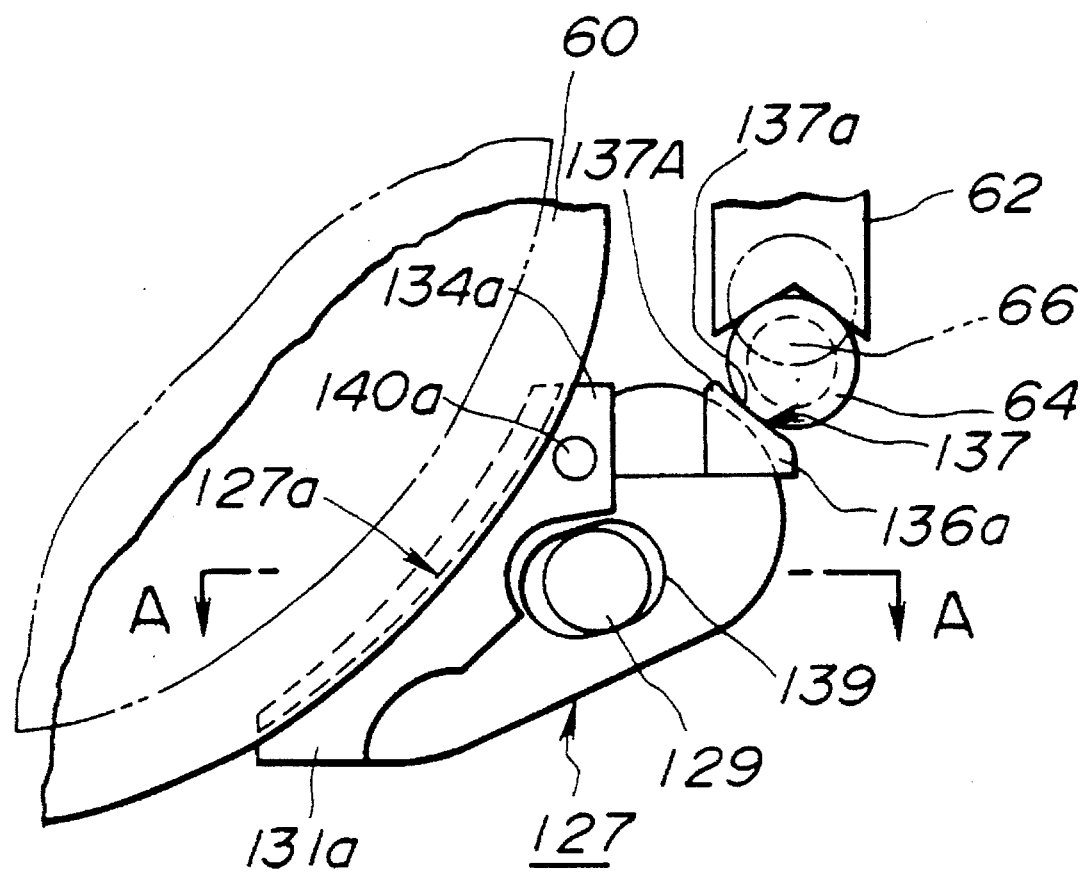
FIG. 7 is a plan view showing a self aligning guide of the tape cassette of the present invention in the state in which a wing guide of the head drum abuts the self aligning guide.
Figure 8:
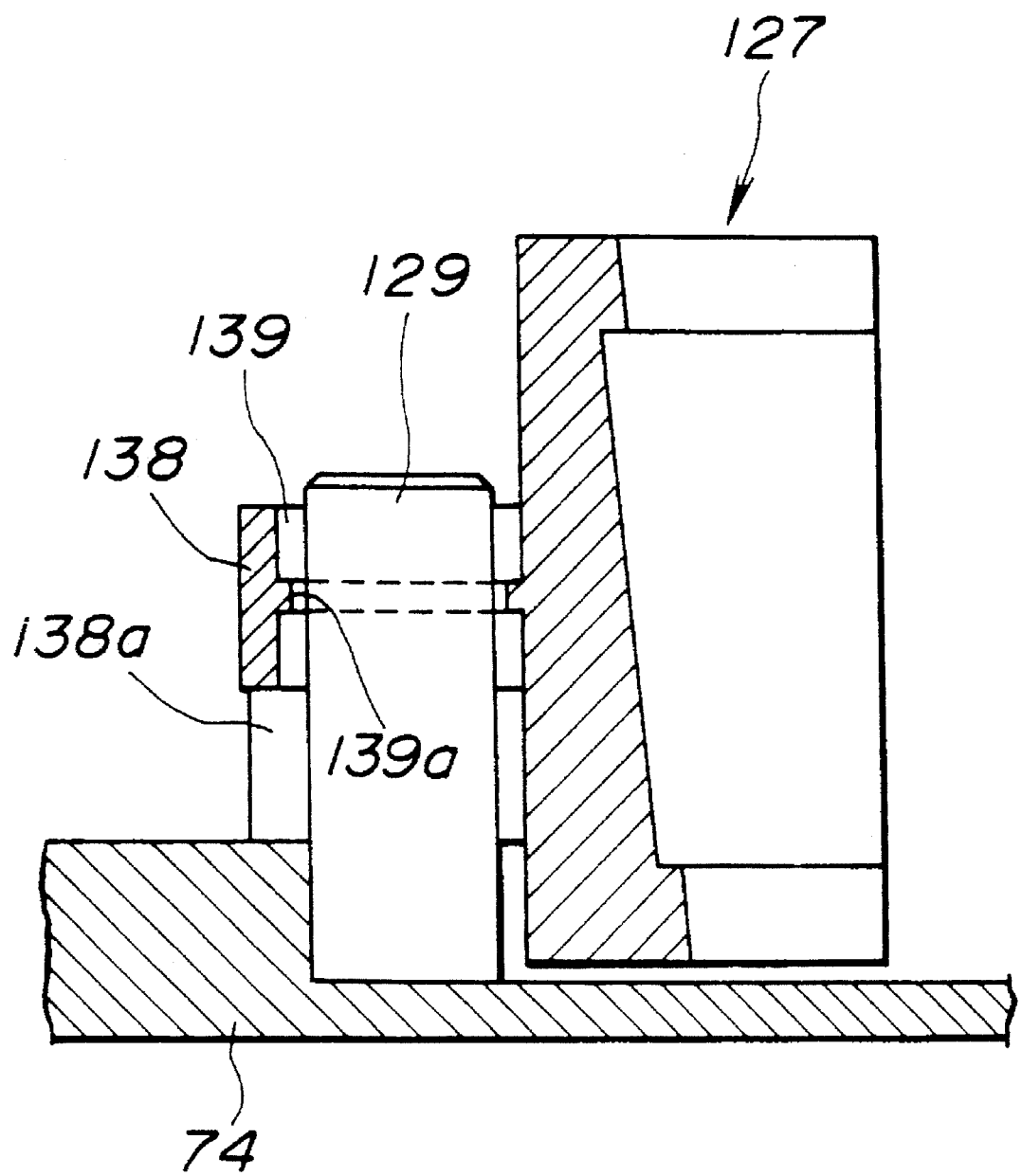
FIG. 8 is a sectional view taken across a line A—A in FIG. 7.
Figure 9:
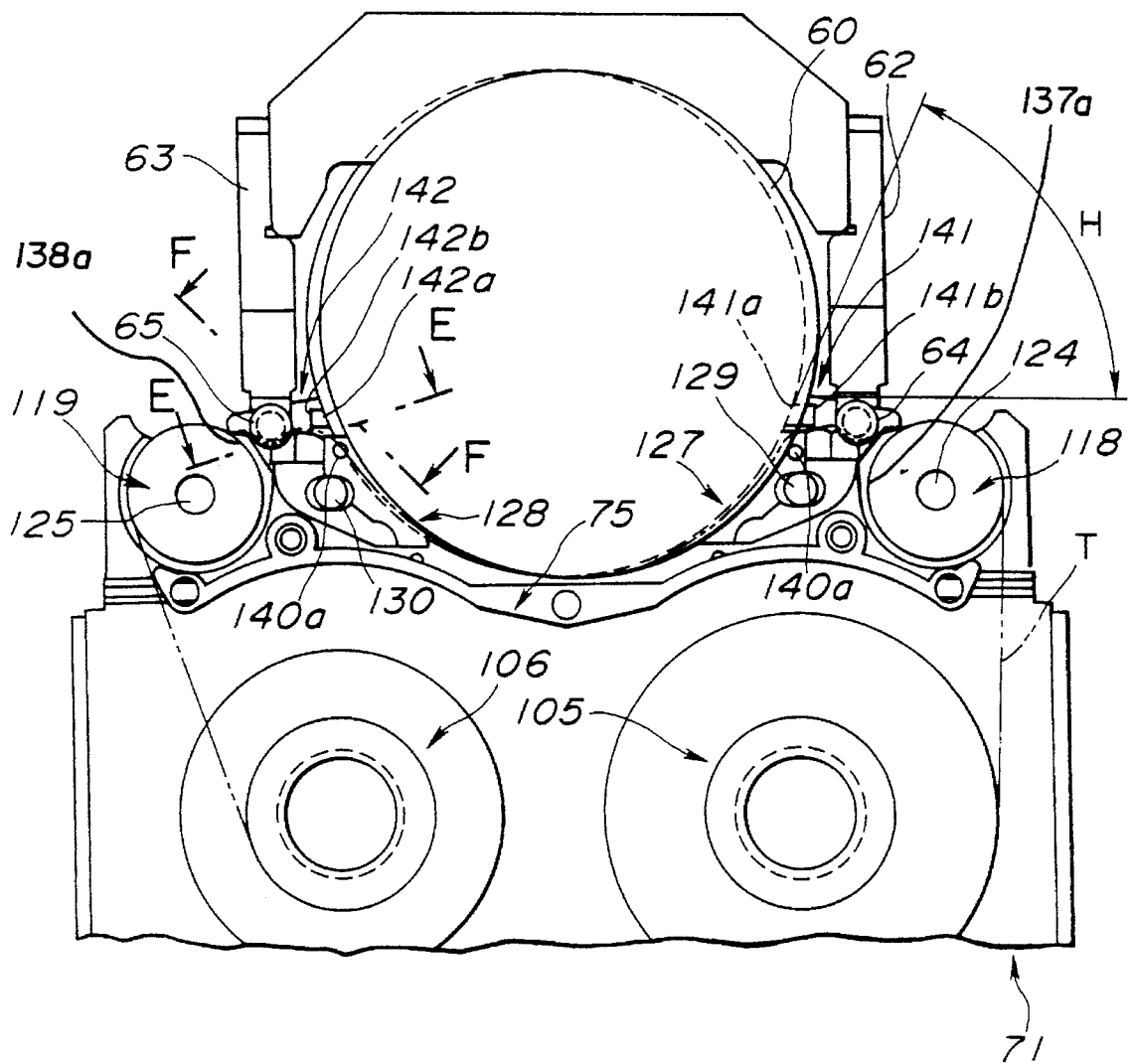
FIG. 9 is a plan view showing the tape cassette of the present invention and the head drum in the loaded state.
Figure 10:
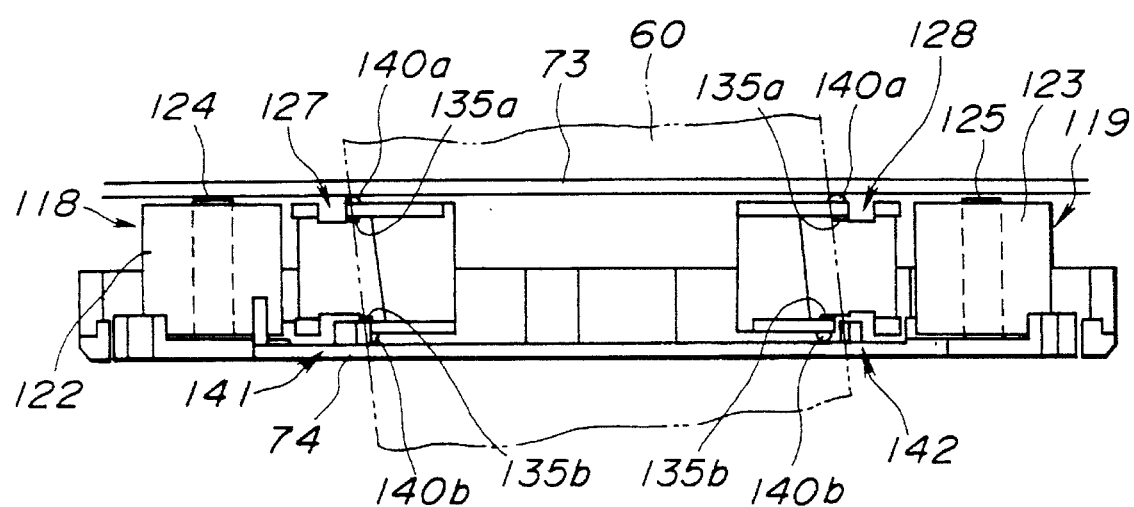
FIG. 10 is a front elevation showing the tape cassette of the present invention, having the head drum loaded therein.

As shown in FIGS. 4, 5 and 9, this tape cassette is approximately left-and-right symmetrical (bilateral symmetry), and an imaginary vertical median plane (center plane) bisecting the cassette into left and right halves is located between the left and right self aligning guides 127 and 128 (and the other left and right pairs). The front end apex 137A of each slant surface 137a is closer to the above-mentioned median plane than the rear end of that slant surface 137a. As shown in FIG. 9, in each of the left and right halves of the cassette, the position of the slant surface 137a along the left and right direction is intermediate between the axis of the pinch roller 118 or 119 and the pivot shaft of the self aligning guide 127 or 128. The apex of the slant surface, in the state shown in FIG. 9, is located forwardly and remotely from the median plane, as compared with the pivot shaft 129 or 130. The slant surface 141a or 142a of each drum guide 141 or 142 faces toward the median plane, and is situated ahead of the apex 137A of the slant surface, and closer to the median plane than the apex 137A of the slant surface.

Reference numerals 143 and 144 denote support pieces extending in the up and down direction. These support pieces are formed integrally with the upper half 73, and each projecting end abuts the positioning portion 141b, 142b of the drum guide 141, 142.

Reference numerals 145 and 146 denote projections for preventing the tape from running off the correct path. The projections 145 and 146 are located, respectively, on the outer lateral sides of the support pieces 143, 144, and integrally formed in the upper half 73.

A reference numeral 147 denotes a lid having a cover portion 148 for opening and closing the cassette opening 75, and two arms 149, 150 which project from both ends of the cover portion 148 and abut, face to face, the shaft supporting surfaces 99, 100, respectively. The lid 147 is rotatably supported on the upper half 73. The cover portion 148 is formed with a guide groove 148 extending in the longitudinal direction of the cover portion, and a rack 148b for engaging with a cassette changer (not shown). Each of the arms 149 and 150 has a shaft hole 149a, 150a receiving the pivot pin 99a, 100a, and a click groove 149b, 150b corresponding to the click projection 103, 104.

The cover portion 148 has a recess 160 formed approximately at the longitudinal middle of the cover portion 148. In this recess 160, there is provided a gate G used for injection of resin in forming the lid 147.

When the thus constructed tape cassette is loaded in a recording and/or reproducing equipment, the lid 147 rotates to open the cassette opening 75, and the head drum 60 moves into the cassette opening 75 together with wing guides 62, 63. Thus, the head drum 60 is inserted, the tape T is put in sliding contact with the head drum 60, and the tape guide portions 66, 67 of each of the wing guides 62, 63 is interposed between the pinch roller 118, 119 and the support piece 143, 144 (the drum guide 141, 142).

While the cassette is being loaded, the drum guides 141, 142 regulate the movement of the head drum 60, and the self aligning guides 127 and 128 move mainly. Therefore, it is possible to prevent the occurrence of dispersion or scattering in the positions of the head drum 60 relative to the shell body 71 in the inserting direction and the lateral direction perpendicular to the inserting direction, and at the same time reduce a frictional force loss occurring between the head drum 60 and the self aligning guides 127, 128.

According to the position and posture of each of the self aligning guides 127, 128, only one of the front end portions (the drum insertion initial end's side of the groove 127a, 128b) and the rear end portions (the drum insertion terminal end's side of the groove 127a, 127b) of the support fringes 131a, 131b first come in contact with the head drum 60, and receive a pushing force. This pushing force causes the self aligning guide 127, 128 to rotate about the pivot shaft 129, 130 until the head drum 60 abuts the other end portion of each support fringe 131a, 131b.

Figure 11:
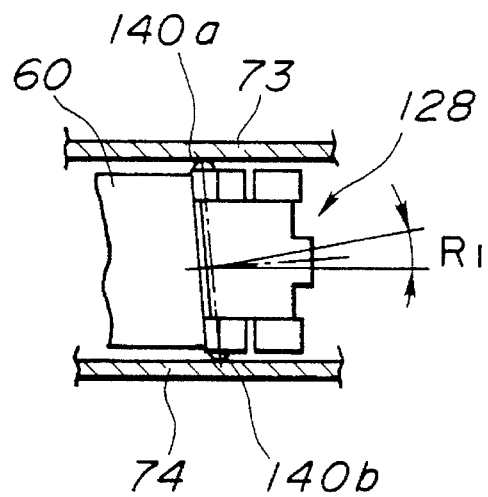
FIG. 11 is a sectional view taken across a line E—E in FIG. 9.
Figure 12:
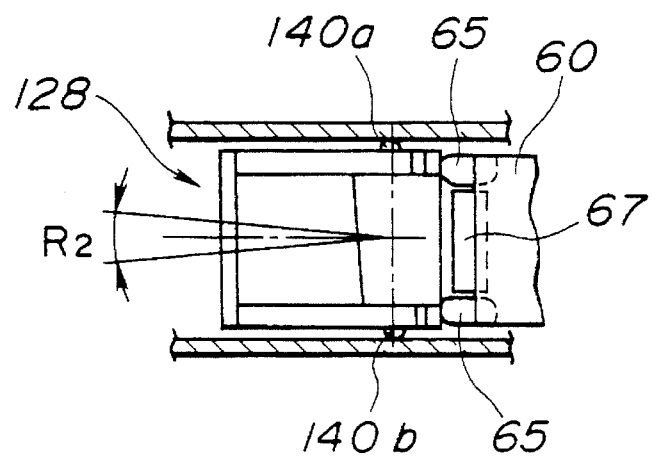
FIG. 12 is a sectional view taken across a line F—F in FIG. 9.
Figure 13:
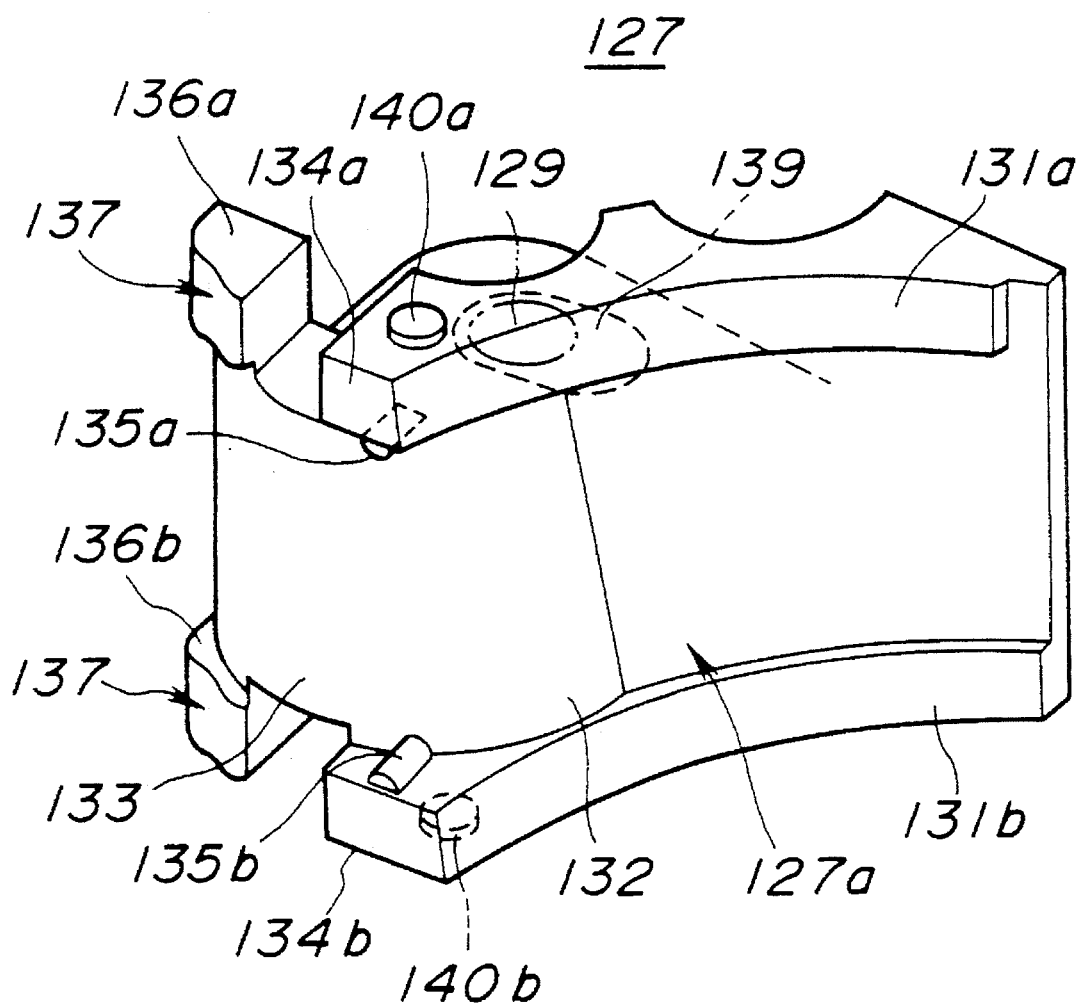
FIG. 13 is a perspective view showing the self aligning guide of the tape cassette according to the present invention.
Figure 14:
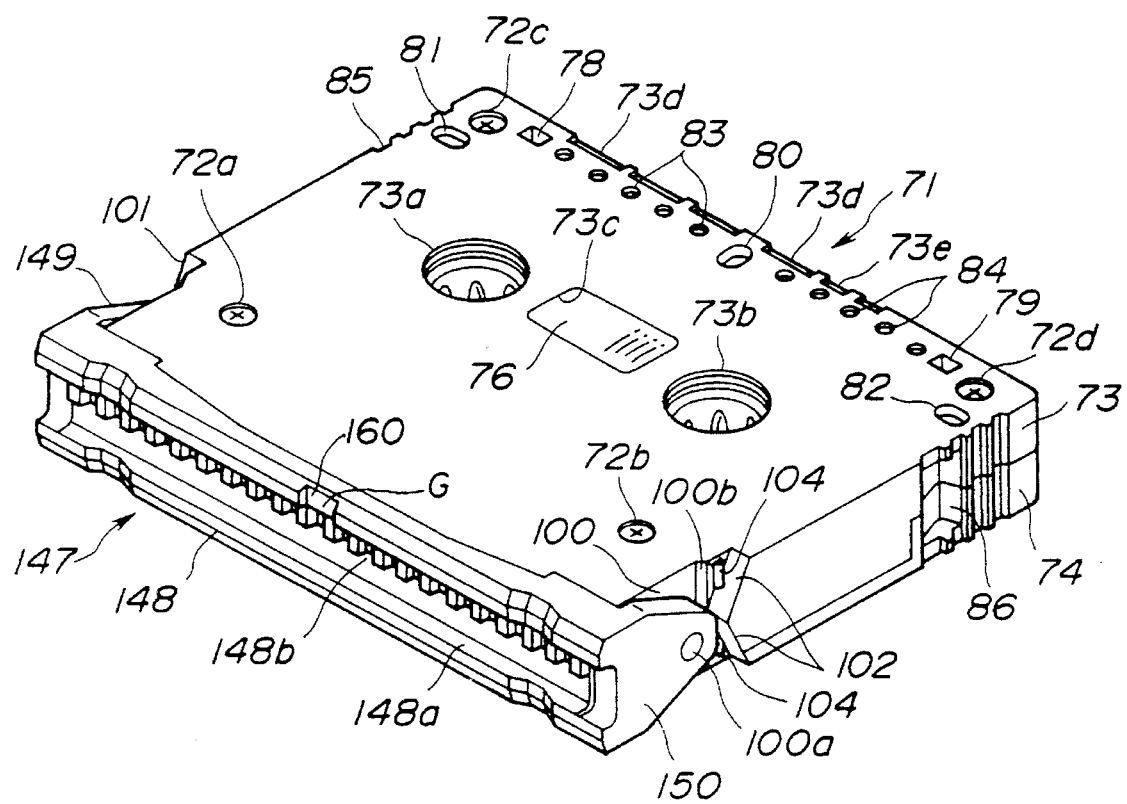
FIG. 14 is a front side perspective view showing the whole tape cassette of the present invention.
Figure 15:
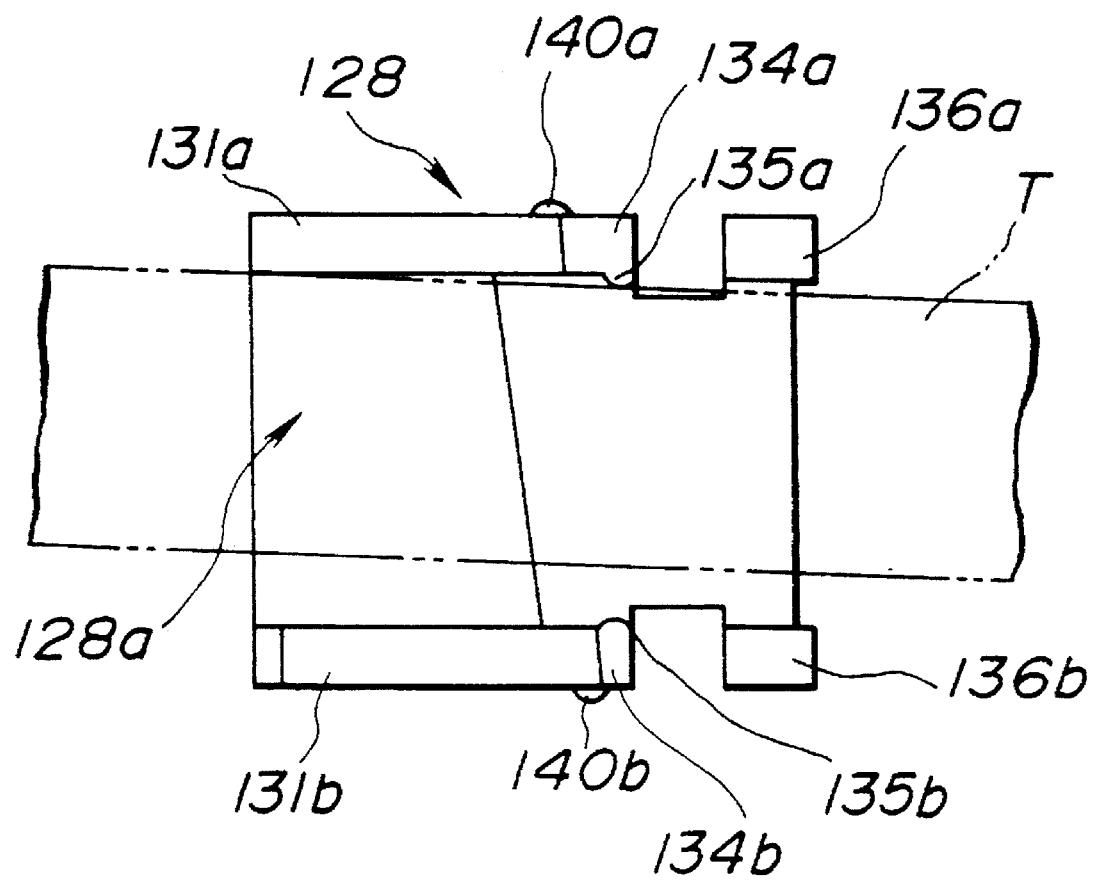
FIG. 15 is a front view showing the recording medium abutting the self aligning guide of the tape cassette of the present invention.

When the head drum 60 first abuts only one of the upper and lower support fringes 131a and 131b, then the self aligning guide 127, 128 is inclined by the action of a pushing force of the drum with the abutting portion of the support fringe 139a serving as a fulcrum with respect to the pivot shaft 129, 130, and the pivots 140a, 140b serving as fulcrums with respect to the halves 73, 74 until the head drum abuts the other support fringe 131a, 131b. Therefore, although each self aligning guide 127, 128 rotates in directions shown by arrows R1, R2 (FIGS. 11 and 12), this structure can decrease the amount of this rotational movement and the amount of the displacement in the up and down direction, reduce the amount of relative displacement between the head drum 60 and the self aligning guide 127, 128, and prevent the occurrence of dispersion or scattering in the heights of the self aligning guide 127, 128 relative to the head drum 60.

If at least one of the wing guides 62, 63 is dislocated in the direction approaching the other wing guide or in the drum inserting direction, the self aligning guides 127, 128 move toward each other, and move through the shaft hole 139 in the drum inserting direction. If at least one of the wing guides 62, 63 is dislocated in the direction separating both wing guides wider apart or in the drum extracting direction, the self aligning guides 127, 128 move away from each other, and move through the shaft hole 139 in the drum extracting direction until each self aligning guide abuts on the outside surface of the head drum 60.

In this way, the insertion of the head drum 60 into the cassette opening 75 causes the self aligning guides 127, 128 to firmly abut the outside surface of the drum in the correct state at the front, rear, upper and lower ends of the support fringes 131a, 131b.

The tape guide portion 66, 67 of each wing guide 62, 63 is interposed between the drum guide 141, 142 (the support piece 143, 144), and the pinch roller 118, 119, and put in rolling contact with the magnetic tape T. At the same time, the flanges 64, 65 abut on the slant surfaces 137a of the recesses 137 of the pushing fringes 136a, 136b of the self aligning guides 127, 128.

When the head drum 60 is inserted in the cassette opening 75, the wing guides 62, 63 abut the pushing fringes 136a, 136b of the self aligning guides 127, 128, so that the azimuth direction of the self aligning guides 127, 128 is determined. Furthermore, the head drum 60 abuts the support fringes 131a, 131b to determine the angle of elevation (aori direction). In this state, the tape slides on the vertical guide surface 133 and the slant guide surface 132 between the support fringes 131a, 131b.

In this case, the self aligning guide 127 with the recess 137 having the slant surface 137a which is steep and has a wide slope range, is able to reduce the friction loss between the slant surface 137a and the wing guide 62, 63, the position error of the wing guide 62, 63 relative to the head drum 60, and the position error of the wing guide 62, 63 occurring in the right and left direction during insertion of the drum.

Moreover, it is possible to reduce the friction loss occurring when the self aligning guide 127 and the head drum 60 abut each other.

The receiving portion 120b, 121b provides a self aligning effect of the pinch roller 118, 119 with respect to the roller shaft 124, 125. Therefore, it is possible to mitigate the requirements of accuracy in dimensions of component parts and accuracy in installation (the dimensional accuracies of the wing guide height and the reel height, and the installation accuracies of the roller shafts), and to prevent the roller shafts 124, 125 from being deflected by the pressure of a capstan (not shown). The pinch rollers 118, 119 have the up and down symmetry. Therefore, it is possible to mount these rollers on the roller shafts 124, 125 in inverse relation (in such a manner as to make the polishing directions of the tape contact surfaces of the pinch rollers different from each other).

The magnetic tape T stretched between both of the pinch rollers 118, 119 is received between the guide projections 135a and 135b of the self aligning guides 127, 128 when the head drum is inserted in the cassette opening 75. Therefore, the tape is reliably set on the slant guide surface 132 between the support fringes 131a, 131b of each self aligning guide 127, 128, so that the magnetic tape can run smoothly along the tape path without being clamped at the abutting portions between the head drum 60 and the self aligning guides 127, 128.

In this practical example, the invention is applied to the tape cassette of a very small size. However, the present invention is not limited to this, but the present invention is also applicable to tape cassettes of larger sizes.

Furthermore, the present invention is not limited to the above-mentioned example, but it is possible to make appropriate modifications according to the technical concept of the present invention.

As explained above, according to the present invention, there are provided a shell body having an opening for insertion and extraction of a head drum, and a ribbonlike recording medium which is windingly disposed in the shell body and which is wound on the outside circumferential surface of the head drum, a pair of pinch rollers for guiding the recording medium are movably provided in the opening of the shell body, the ends of a roller shaft rotatably supporting each pinch roller are both supported or both fixed, and there are provided, around the middle portions of the roller shafts, receiving portions swingably holding the pinch rollers. Therefore, the self aligning effect of each pinch roller with respect to the roller shaft can be obtained by the receiving portion.

Furthermore, the structure supporting or fixing both ends of the roller shafts can prevent each roller shaft from being bent by the pressure of a capstan. Therefore, it is possible to prevent creep deformation due to maintenance of the deflected state of the roller shafts.

Furthermore, according to the present invention, there are provided a shell body having an opening for insertion and extraction of a head drum, and a ribbonlike recording medium which is windingly disposed in the shell body and which is wound on the outside circumferential surface of the head drum. A pair of tape guides for guiding this recording medium are movably (movable within a predetermined range) supported in the opening of the shell body, and there is provided, on the drum extraction side of each tape guide, a drum guide for guiding the head drum to a drum inserted position. Therefore, during cassette loading, it is possible to control the movement of the head drum with the drum guide or drum guides, and to cause both self aligning guides to move mainly.

Therefore, between the head drum and the self aligning guides, there are formed no gaps as in a conventional example. It is possible to cause the head drum and the self aligning guides to abut reliably, and provide good recording and/or reproducing performance.

We claim:

1. A tape cassette comprising:

a shell body having upper and lower halves;

a nonrotational shaft portion including an upper shaft section projecting from said upper half toward said lower half and having a lower end formed with a downwardly facing annular upper thrust receiving surface facing toward said lower half, a lower shaft section projecting from said lower half toward said upper half and having an upper end formed with an upwardly facing annular lower thrust receiving surface, and a reduced middle shaft section extending from the lower end of the upper shaft section to the upper end of the lower shaft section and having an upper end surrounded by said downwardly facing upper thrust receiving surface and a lower end surrounded by said upwardly facing lower thrust receiving surface; and a pinch roller including a tubular holder rotatably mounted on said shaft portion of said shell body and including an upwardly facing upper shoulder surface for limiting an upward axial movement of the holder by abutting on said downwardly facing upper thrust receiving surface of said shell body, and a downwardly facing lower shoulder surface for limiting a downward axial movement of said holder by abutting on said upwardly facing lower thrust receiving surface of said shell body, an upper annular wall surrounding said upper shaft section, a lower annular wall surrounding said lower shaft section, and an annular receiving portion projecting inward and having an inside circumferential surface which slidably fits over an outside surface of said middle shaft section, an axial distance between said upper and lower shoulder surfaces of said holder being smaller than a length of said holder between an upper end of said holder and a lower end of said holder.

2. A tape cassette according to claim 1 wherein said lower shaft section has an outside cylindrical surface of a first diameter, said upper shaft section has an outside cylindrical surface of a second diameter which is smaller than said first diameter, and said reduced middle shaft section has an outside cylindrical surface of a reduced diameter which is smaller than said second diameter, and wherein each of said upper and lower annular walls has an inside cylindrical surface of an equal diameter.

3. A tape cassette according to claim 2 wherein said receiving portion has an inside cylindrical surface fitting over the outside cylindrical surface of the reduced shaft section.

4. A tape cassette according to claim 1 wherein said reduced shaft section comprises a bulge having an outside convex surface generated by rotating a first predetermined curved line segment around the axis of said shaft portion, and said receiving portion has an inside concave surface which is generated by rotating a second predetermined curved line segment around the axis of said holder and which fits over the outside convex surface of the reduced shaft section.

* * * * *